US007718751B2

(12) United States Patent
Orpin

(10) Patent No.: US 7,718,751 B2

(45) Date of Patent: May 18, 2010

(54) SYNTACTIC PHENOLIC FOAM COMPOSITION

(75) Inventor: Murray Orpin, Leominster (GB)

(73) Assignee: Pyro Technologies Limited (GB)

( * ) Notice: Subject to any disclaimer, the term of this patent is extended or adjusted under 35 U.S.C. 154(b) by 623 days.

(21) Appl. No.: 11/375,883

(22) Filed: Mar. 15, 2006

(65) Prior Publication Data

US 2006/0160914 A1 Jul. 20, 2006

Related U.S. Application Data

(63) Continuation of application No. 10/715,948, filed on Nov. 18, 2003, now abandoned.

(30) Foreign Application Priority Data

Nov. 18, 2002 (GB) ................................ 0226773.0

(51) Int. Cl.
*C08J 9/00* (2006.01)
*C08J 9/32* (2006.01)

(52) U.S. Cl. ...................... 528/129; 528/137; 528/165; 521/54; 521/56; 521/59; 521/136; 521/180; 521/181

(58) Field of Classification Search .................. 521/54, 521/56, 59, 136

See application file for complete search history.

(56) References Cited

U.S. PATENT DOCUMENTS

| | | | | |
|---|---|---|---|---|
| 3,615,972 | A | 10/1971 | Morehouse, Jr. et al. | 156/79 |
| 4,067,829 | A | 1/1978 | Garrett | 260/2.5 |
| 4,714,715 | A | 12/1987 | Mosier | 521/54 |

FOREIGN PATENT DOCUMENTS

| | | |
|---|---|---|
| EP | 0237596 | 9/1987 |
| EP | 0486080 | 1/1996 |
| EP | 0630956 | 12/2000 |
| EP | 1149628 | 10/2001 |
| GB | 1414506 | 11/1975 |
| WO | WO87/97560 | * 12/1987 |

OTHER PUBLICATIONS

International Search Report for International Application No. PCT/EP03/13047 mailed Apr. 3, 2004.

* cited by examiner

*Primary Examiner*—Irina S Zemel

(74) *Attorney, Agent, or Firm*—Van Dyke, Gardner, Linn & Burkhart, LLP

(57) ABSTRACT

The present invention concerns a pre-mix for a syntactic phenolic foam composition; a syntactic phenolic foam composition; and a process for preparing the syntactic phenolic foam composition.

The pre-mix comprises thermally expandable and/or expanded thermoplastic microspheres, the microspheres comprising a thermoplastic polymer shell made of a homopolymer or copolymer of 100 to 25, for example 93 to 40, parts by weight of a nitrile-containing, ethylenically unsaturated monomer, or a mixture thereof; and 0 to 75, for example 7 to 60, parts by weight of a non-nitrile-containing, ethylenically unsaturated monomer, or a mixture thereof; and a propellant, or a mixture thereof, trapped within the thermoplastic polymer shell; and one of either a highly reactive phenolic resole resin capable of fully crosslinking at temperatures between 15° C. and 60° C., optionally in the presence of up to ten times its own weight in water, and having, typically, a free phenol content of 12-15% (w/w); or an acidic catalyst for curing the phenolic resole resin.

The process comprises either curing the above-mentioned pre-mix in the presence of the other of the acidic catalyst; and the highly reactive phenolic resole resin, as defined above or, alternatively, curing all three components, together with any other components.

43 Claims, No Drawings

SYNTACTIC PHENOLIC FOAM COMPOSITION

This application is a continuation of U.S. co-pending application Ser. No. 10/715,948, filed Nov. 18, 2003, entitled A SYNTACTIC PHENOLIC FOAM COMPOSITION, by Applicant Murray Orpin, which is incorporated herein in its entirety.

The present invention relates to a syntactic phenolic foam composition. The term 'syntactic' is derived from the Greek words syn and tacheo, meaning effectively "put with" or "put together". Whilst non-syntactic foams are essentially cellular materials where the microcellular structure has been created by stabilised gas bubbles (a 'blowing agent') within a matrix material, syntactic foams are created as a composite of closed-cell materials, e.g., microspheres, encapsulated within a matrix.

Syntactic foams tend to have a limiting density of around 500 kg/m$^3$ due to the amount of matrix material required to wet the surface of the closed-cell materials. With an epoxy resin or polyurethane matrix, syntactic foams are commonly used in the offshore process industries as moulded buoyancy modules and in the thermal insulation of subsea pipelines.

Foams with a phenolic resin matrix, i.e. phenolic foams, as a class of materials, are known for their excellent fire resistance and thermal properties but their commercial potential in many fields of application is impeded due to their poor structural properties characterised by high brittleness and friability. Essentially, the present invention hinges on the potential to form tough, lightweight, fire resisting materials from the synergistic combination of a specific, highly reactive, phenolic resin and specific thermoplastic microspheres. The literature is completely silent on the specific properties (defined limits) necessary to achieve the objects of the present invention. More particularly, the specific phenolic resin type is crucial to all aspects of the present invention, not least because water occurs as a system diluent in all cases and this resin is uniquely able to produce the described materials rapidly without being dramatically slowed or weakened by the presence of such water.

PRIOR ART

The overall concept of a syntactic phenolic foam composition comprising a combination of thermoplastic microspheres (whether expandable or expanded) together with a phenolic resin has been generically disclosed. Specifically, U.S. Pat. No. 4,067,829 discloses certain cured resole resins, having a reduced tendency to corrode steel. These resole resins may optionally contain expandable microspheres as a foaming agent.

OBJECTS OF THE INVENTION

It is an object of the invention to provide a range of structural syntactic phenolic foam compositions with improved fire resistance compatible with the requirements of the aerospace, defence, construction, offshore and transportation industries. Such improved fire resistance can be measured by one or more of the following test parameters:

| STANDARD | PERFORMANCE |
|---|---|
| BS6853 | Category 1 |
| NES713 | Toxicity Index <5 |
| ATS1000.001 | Smoke & Toxicity pass |
| IMO Res. A653(16) | Pass (walls & ceilings) |
| IMO Res. MSC 61 (67) | Pass |
| FAR 25.853 (Heat release) | Pass (24.0/32.7) |

By "structural" is meant the ability to bear either static or cyclic loads consistent with the intended final application of the manufactured component, where such application is defined as structural or semi-structural in nature. Conventional phenolic foams are not suitable for such applications due to their brittle, friable nature, whereas the compositions of this invention display varying degrees of resilience derived from the presence of thermoplastic microsphere fillers without compromising the excellent fire and thermal resistance of the phenolic matrix. Suitable compressive strengths of the syntactic phenolic foam compositions of the present invention are in the range of 0.1 to 10 MPa, for example, 0.15 to 5 MPa at an ambient temperature of 15 to 25° C.

It is a further object of the invention to

1. Produce a range of materials that are highly cost efficient within their intended field of application;
2. Define flexible and facile processing that is capable of producing finished components rapidly with minimal secondary operations;
3. Offer a phenolic resin based foam that is effectively pH neutral (for example 6 to 8.5) in service and is therefore free of corrosion risk;
4. Define a wide range of foam densities that may be produced from the materials technology; and/or
5. Provide example of specific engineered materials systems with optimised performance in their intended fields.

STATEMENTS OF INVENTION

According to a first aspect of the present invention there is provided a premix for a syntactic phenolic foam composition, the premix comprising thermally expandable and/or expanded thermoplastic microspheres, the microspheres comprising a thermoplastic polymer shell made of a polymer or copolymer of 100 to 25, for example 93 to 40, parts by weight of a nitrile-containing, ethylenically unsaturated monomer and 0 to 75, for example 7 to 60, parts by weight of another ethylenically unsaturated monomer, and a propellant trapped within the polymer shell; and one of either a highly reactive phenolic resole resin capable of fully crosslinking at temperatures between 15° C. and 25° C., optionally in the presence of up to ten times its own weight in water, and having, typically, a free phenol content of 12-15% (w/w);

or an acidic catalyst for curing the phenolic resole resin.

It is believed that microspheres mixed with the phenolic resole resin are usually less stable than microspheres mixed with the acidic catalyst.

It is further believed that the pre-mix of the acidic catalyst and the thermoplastic microspheres is a corrosive solid. One advantage of this particular pre-mix is to distribute the acidic catalyst in the microsphere phase, in order to effectively produce the ultra-lightweight resilient foams of Examples 5 and 6 since the volumetric ratios (300-400:1(v:v)-microspheres:

all other ingredients) between the microspheres and the phenolic resole resin are enormous.

It is believed that, if a cured foam composition is made using a pre-mix of the phenolic resole resin and thermoplastic microspheres, with a subsequent addition of the acidic catalyst or, alternatively, with a pre-mix of the acidic catalyst and thermoplastic microspheres with the subsequent addition of phenolic resole resin, the properties of the final cured foam are not substantially affected.

According to a second aspect of the present invention there is provided a syntactic phenolic foam composition comprising a highly reactive phenolic resole resin capable of fully crosslinking at temperatures between 15° C. and 25° C., optionally in the presence of up to ten times its own weight in water, and having, typically, a free phenol content of 12-15% (w/w);

an acidic catalyst for curing the phenolic resole resin; and thermally expandable and/or expanded thermoplastic microspheres, the microspheres comprising a thermoplastic polymer shell made of at least one homopolymer or copolymer of 100 to 25, for example 93 to 40, parts by weight of a nitrile-containing, ethylenically unsaturated monomer and 0 to 75, for example 7 to 60, parts by weight of at least one non-nitrile-containing, ethylenically unsaturated monomer, and at least one propellant trapped within the polymer shell.

According to a third aspect of the present invention, there is provided a process for preparing a syntactic phenolic foam composition according to a second aspect of the present invention, the process comprising curing the premix of the first aspect of the present invention in the presence of the other of either the acidic catalyst for curing the phenolic resole resin;

or the highly reactive phenolic resole resin capable of fully crosslinking at temperatures between 15° C. and 25° C., optionally in the presence of up to ten times its own weight in water, and having, typically, a free phenol content of 12-15% (w/w).

In a still further aspect of the invention, there is provided a process for preparing the syntactic phenolic foam composition according to the second aspect of the invention, the process comprising curing a highly reactive phenolic resole resin capable of fully crosslinking at temperatures between 15° C. and 25° C., optionally in the presence of up to ten times its own weight in water, and having, typically, a free phenol content of 12-15% (w/w);

an acidic catalyst for curing the phenolic resole resin; and thermally expandable and/or expanded thermoplastic microspheres, the microspheres comprising a thermoplastic polymer shell made of at least one homopolymer or copolymer of 100 to 25, for example 93 to 40, parts by weight of a nitrile-containing, ethylenically unsaturated monomer and 0 to 75, for example 7 to 60, parts by weight of at least one non-nitrile-containing, ethylenically unsaturated monomer, and at least one propellant trapped within the polymer shell.

Preferably, the phenolic resole resin has a viscosity of between 2,000-4,000 cP at 25° C. and/or a water content of 2-5% (w/w of the phenolic resole resin), for example 3-4%, (w/w of the phenolic resole resin). The preferred resin is produced by the base-catalysed condensation reaction of a molar excess of an aldehyde, preferably formaldehyde, with a substituted or unsubstituted phenol, preferably unsubstituted phenol (1.4 to 1.8:1, for example, about 1.6:1) at temperatures not exceeding 65° C., for example no more than 60° C.±2° C. or no more than about 60° C. This limiting temperature of 65° C. must be maintained while the basic catalyst is active i.e., until the basic catalyst is neutralised. This limiting temperature allows the maximum substitution of the phenol aromatic ring by reactive methylol groups and results in only low molecular weight development in the polymer. Water may then be optionally distilled off to the preferred specification. Due to the resulting low molecular weight (less than 1000 Daltons), the resin is highly soluble in water without phase separation and remains sufficiently reactive to cross-link under dilute aqueous conditions. The preferred phenolic resin will achieve high peak exotherm temperatures of 155-170° C. in conjunction with mild phosphoric acid ester-based catalysts such as Hordaphos CCMS ex Clariant AG. Peak exotherm testing is based on 30 g phenolic resin at 25° C. (held in a 45 mm diameter×110 mm high test tube) catalysed with 7% w:w (7 parts: 100 parts resin) catalyst. Peak exotherm should occur in <10 minutes without any input of external heat.

It will be appreciated that it is critical that the phenolic resole resin is highly reactive but that its viscosity and water content, as defined hereinabove, are but indirect guides to the required highly reactive nature of the phenolic resole resin. For these reasons, the parameters defining this high reactivity can be amended or modified, as will be appreciated by those skilled in the art.

Thermoplastic microspheres are, by the "thermoplastic" definition, meltable by the appropriate application of heat and are readily combustible in a fire situation. They offer the key benefits of extreme low density in the 20-40 kg/m$^3$ range combined with high resilience and toughness.

A critical feature of this invention is the mechanism by which the highly reactive phenolic resole resin is able to plasticise and interact chemically with the thermoplastic shell of the microspheres, especially the nitrile-based element (e.g., polyacrylonitrile—PAN). This results in dramatically reduced expansion temperatures for the microspheres down to typically half that found in other matrices. After processing, the phenolic resin then cross-links as a hybrid with the thermoplastic homopolymer/copolymer and, as a result, a fully synergistic composite product is formed whereby the phenolic resin modified microspheres become highly fire resistant and the syntactic phenolic foam so formed is no longer rigid and brittle but is, conversely, tough and resilient in nature.

Without being bound by theory, the inventor suggests that these benefits may be derived from the ability of the nitrile-based element, for example PAN, as a polymer to be capable of producing very high carbon yield under carefully controlled thermal conditions and, as such, is the precursor for the bulk of the world's carbon fibre production. Incorporation of the highly cross-linked thermoset phenolic matrix into the nitrile-based polymer chain (for example, the PAN polymer chain) appears to produce the correct conditions for carbonisation on the application of direct and extreme heat, a unique and valuable property.

The above synergistic relationship between the phenolic resin and the thermoplastic microspheres is effective even at very low ratios as low as 10 parts resin to 100 parts microspheres by weight. As a result, this invention is able to disclose syntactic foam densities not previously thought possible, down to the density range of 20-50 kg/m$^3$ (see Examples 5 and 6).

The flexibility of processing described herein, as derived from the nature of the highly reactive phenolic resin combined with different forms of thermoplastic microsphere (e.g., unexpanded or 'wet expanded'), results in a variety of novel materials technologies for different demanding industrial applications where fire and heat resistance are primary requisites often in combination with low density.

Thermoplastic Microspheres

The Dow Chemical Company originally developed expanding thermoplastic microspheres and the current main supplier is Akzo Nobel, under the Registered Trade Mark Expancel. Suitable microspheres for use in the present invention are either expandable and/or expanded thermoplastic microspheres, or a mixture thereof, and comprise a thermoplastic polymer shell made of a homopolymer or copolymer of 100 to 25, for example, 93 to 40, parts by weight of at least one nitrile-containing, ethylenically unsaturated monomer and 0 to 75, for example, 7 to 60, parts by weight of at least one non-nitrile-containing, ethylenically unsaturated monomer, entrapping at least one propellant therewithin. The microspheres expand by heating above the boiling point of the propellant and above the softening point of the polymer shell.

Suitable nitrile-containing, ethylenically unsaturated monomers include, but are not limited to, one or more of acrylonitrile, methacrylonitrile, α-chloroacrylonitrile, α-ethoxyacrylonitrile, fumaroacrylonitrile, crotoacrylonitrile, of which acrylonitrile or methacrylate is preferred.

Suitable non-nitrile-containing, ethylenically unsaturated monomers include, but are not limited to acrylic esters, methacrylic esters, vinyl chloride, vinylidene chloride, vinylidene dichloride, vinyl pyridine, vinyl esters, styrenes and derivatives or mixtures thereof, of which vinylidene chloride and/or vinyl chloride are preferred.

Of the thermoplastic microspheres currently commercially available, the Expancel grades 551DU (Dry Unexpanded) and 551WE (Wet Expanded) are suitable for the utilities of the present invention. The 551 grade has a polymer shell comprising a copolymer of monomers of vinylidene chloride (PVDC) and acrylonitrile (PAN) and housing a liquid volatile propellant, isobutane. Softening of this copolymer should begin in the range 93-98° C. and maximum expansion of this copolymer should occur in the range of 129-148° C. (maximum expansion in the 551 grade being directly dependent on the particle size). However, in the presence of phenolic resole resin, the shells are plasticised and partially solvated so that expansion may begin at around 55° C. In addition, the 551 grade has an outer shell that is mildly acidic and thus compatible with the curing chemistry as used herein.

In contrast, pure PAN microspheres and other derived copolymers will rupture and dissolve in phenolic resole resin within 24 hours at ambient temperature or much more quickly between 30-40° C. Consequently, any material formulation derived from these microspheres must be used with care and without pre-blending with the resin component. However, pure PAN-based microspheres such as the Expancel 091 grade may be used in the present invention, by pre-blending with an excess (2-4 times the weight quantity used with Expancel 551) of acidic catalyst, to overcome their inherent alkalinity. The resultant syntactic catalyst is stable for storage but must be used immediately on blending with the phenolic resin in order to avoid rupture of the microspheres.

The choice of the 551 grade is important for the stability of a mixed system, which would require bulk storage for up to 2 months, typically. It is also known that storage of the resin/microsphere blend also brings about maturation in the system, which leads to optimum expansion in the process. The unexpanded grade is less sensitive to storage maturation than the expanded grade, which has a much thinner cell wall. In the latter event, long term storage is not feasible unless the resin forms less than 35% of the mixed mass (i.e., 2:1 (w:w) 551WE:resin). This is relevant to the embodiment exemplified in Example 3 where it becomes necessary to produce a daily blend or possibly combine the wet expanded microspheres with the catalyst in the appropriate ratio to produce a syntactic catalyst that is sufficiently stable.

The propellant is a volatile liquid trapped within the polymer shell. Suitable propellants include various short chain alkanes and short chain isoalkanes such as, but not limited to, isopentane, isobutane, n-butane, hexane, heptane, isooctane, petroleum ether and pentane or mixtures thereof.

Phenolic Resin

The phenolic resin, which must be highly reactive, is used to bind the contacting points of fine-hollow thermoplastic microparticles, as well as any other beneficial functional additives present. For the avoidance of doubt, the expression "optionally in the presence of up to ten times its own weight in water, and having, typically, a free phenol content of 12-15% (w/w)" is not intended to limit the definition of phenolic resole resin as it appears in the description or in the claims.

The phenol may be substituted or unsubstituted. Typical substituted phenols are those in which the substituent does not impede the condensation of the phenol(s) with the aldehyde(s). Suitable substituents include halogens or a hydroxy, alkyl or an aryl group. Unsubstituted phenol is preferred.

Suitable aldehydes are formaldehyde (including oligomers/polymers such as trioxane), furfural, sugars and cellulose hydrolysates. Formaldehyde is preferred.

Suitable alkaline condensation catalysts are ammonia, ammonium hydroxide, sodium hydroxide, potassium hydroxide and barium hydroxide. Sodium hydroxide is preferred.

The phenolic resole resin should preferably be a 'pure' phenolic resole produced from phenol with a molar excess of formaldehyde (116.5 parts by weight of 44% formaldehyde to 100 parts by weight phenol), in the presence of sodium hydroxide (4.2 parts of 25% solution to 100 parts phenol) as a condensation catalyst.

Conventionally, the process temperature in production would be carefully increased to around 60(±2)° C. and held there for a period of ca. 1 hour, after which the temperature would be increased to around 80° C. for a further period of 2-4 hours. The exact times are dependent on batch size but the two stages essentially are:

(1) Ring Substitution@60° C. by formaldehyde into the phenol aromatic ring (2) Condensation Polymerisation@80° C. to increase molecular weight In contrast, the present resin is obtainable, for example, by only heating to no more than 65° C., for example, no more than 60±2° C. or no more than about 60° C. for a period of 5 hours on the above scale (equivalent to ca. 3.5 hours on a laboratory scale) or until an intermediate viscosity of 13.5-14.5 centiStokes at 25° C. is reached for the reaction mixture. This leads to maximum substitution by methylol (—$CH_2OH$) groups in ortho, meta and para positions of the aromatic ring and only low molecular weight build. The mixture is then neutralised with paratoluenesulphonic acid to a pH of less than 7, preferably 5.5-6.6, more preferably about 6 (a pH of around 6 gives enhanced shelf life compared to a pH of 7-8) and most of the process and reaction water may then be distilled off under vacuum down to a level of around 3-4% (3-4 parts w:100 parts w full mixture), for example 3%, (3 parts w:100 parts w full mixture) resulting in a highly reactive prepolymer. It is of course possible to leave a higher water content in the resin but, for the aspects of this invention where water is present from other sources such as wet expanded thermoplastic microspheres, it is desirable to have a minimum realistic water level in the resin phase. Water levels much below 3% (3 parts in 100 parts, both by weight) are extremely hard to achieve and are currently uneconomic to produce. It is believed that the level of reactivity obtainable by the process described above is highly desirable for success in this invention.

A phenolic resole resin produced by the above process to a water content of 3-4% wt. (3-4 parts in 100 parts, both by weight)will typically have a viscosity in the range 2000-4000 cP at 25° C., a free formaldehyde content of 3-5% wt. (3-5 parts in 100 parts, both by weight) and a free phenol content of 12-15% (12-15 parts in 100 parts, both by weight).

The phenolic resole resins disclosed in the prior art are, by contrast, reacted at temperatures between 65-80° C. for longer periods. Any temperature above 65° C. will result in condensation accompanied by higher molecular weight and a reduction in reactive groups. These prior art phenolic resole resins tend to have a final water content in the 10-20% weight range and are themselves intolerant to the addition of further process water which both lowers their reactivity dramatically and causes them to phase separate from the water. Their lower reactivity renders them incapable of rapid or full cure in the presence of excess water that is, by definition, a reaction by-product that will limit the degree of reaction. The only way to attempt to overcome this is to use extremely aggressive catalysts in the form of strong inorganic acids that are known to result in significant corrosion risk potential for any final product.

The technology of the present invention relies on the reactivity of the phenolic resole resin in conjunction with mild inorganic, often phosphoric acid/ester based, catalysts, with or without the presence of strong organic catalysts, that result in final syntactic foam products that are essentially pH 'neutral' and safe in terms of corrosion risk.

The resins may, optionally, be mixed with one or more filling agents such as, but not limited to, water, boric acid, surfactants and chopped fibres (glass fibres, carbon and the like). Although boric acid is an acid, it is not believed to function as a catalyst or curing agent within the present system. Instead, it is believed that boric acid is a synergistic fire and heat quenching filler which, although acidic, is not reactive enough to fully cure the phenolic resole resin. However, being acidic in nature, it may be conveniently added to any pre-mix which also includes the acidic acid component.

The resins may, optionally, be further mixed with macrofillers. By "macrofillers" is meant material such as expanded polystyrene beads, granular and recycled foam particles, cork, foamed clay, exfoliated vermiculite and the like. The resins may further optionally be mixed with functional fillers, which are generically referred to as active ingredients such as boric acid and might also include conductive carbon or even boron carbide for radiation protection. The resins may further optionally include "pigment dispersions", one use of which would be to demonstrate the efficiency of mixing.

Phenolic Resole Resin Catalysts:

Conventionally, strong inorganic acids may be used to cure phenolic resole resins but strong inorganic acids are not suitable for the purposes of the present invention, mainly because of the corrosion hazard on subsequent contact with a metallic substrate. The acids that may be employed as catalysts include strong organic acids such as sulphonic acids and their esters including benzene sulphonic acid, toluene sulphonic acid, phenol sulphonic acid, xylene sulphonic acid, β-naphthalene sulphonic acid, α-naphthalene sulphonic acid, an ester thereof and a mixture thereof. The acids that may be employed as catalysts further include weak inorganic acids and their esters, either alone or in admixture. The acids that may be employed still further include mixtures of two or more of strong organic acids; mixtures of two or more of esters of strong organic acids; mixtures of two or more of weak inorganic acids; and mixtures of two or more of esters of weak inorganic acids, as well as mixtures of different acids or their esters. Suitable catalysts are weak inorganic acids and esters of weak inorganic acids and include phosphate esters and blends of phosphoric acid with strong organic acids such as p-toluene sulphonic acid or any other sulphonic acid or its ester. Mixtures of any two or more of the acids and/or esters can also be used.

Suitable acidic catalysts are supplied by Borden Chemicals under the Trade Mark Phencat. Of the Phencat range, Phencat 10 (o-phosphoric acid and ptoluenesulphonic acid, 15 (o-phosphoric acid and xylene sulphonic acid), 381(partial phosphate ester plus ptoluenesulphonic acid) and 382 (partial phosphate ester), either alone or in combination, may be suitable for use in the present invention. Suitable phosphate ester-based catalysts are supplied by Chemische Fabrik Budenheim as Budit 380 and by Clariant AG as Hordaphos CCMS. Again, these may be used either alone or in combination with other acidic catalysts.

Although many acidic catalysts may be used for curing, each of the Examples 1-6 has its preferred version. In a preferred embodiment (e.g., Example 4), the catalysts may conveniently be blended with wet expanded thermoplastic microspheres to aid handling. This process itself is considered to be novel. The benefits are that volumes of two component systems may be made more equivalent and, secondly, that this approach allows the use of certain thermoplastic microsphere grades that are unstable (will dissolve) in the phenolic resole resin, for example, PAN-based microspheres such as the Expancel 091 grade.

Surfactants:

In order to hasten mixing in the preparation of phenolic resole resin foams, a surfactant or surface active agent may optionally be employed, beneficially a non-ionic surfactant such as the reaction or condensation product of an alkylene oxide having from 2 to 4 carbon atoms in the molecule with a compound such as higher alkylphenols having from 8 to 12 carbon atoms in the alkyl group, fatty acids having from 12 to 22 carbon atoms, and alkyl silanes and silicones. Among suitable surfactants are (a) the polyoxyethylene ethers of alkyl phenols having the general formula

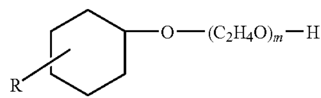

wherein R is an alkyl group having from 8 to 12 carbon atoms and m is an integer from about 8 to 20, (b) ethoxylated castor oil and ethoxylated hydrogenated castor oil; i.e., the condensation product of said castor oils and from 8 to 20 mols of ethylene oxide per mol of said castor oil, (c) copolymers of ethylene oxide and propylene oxide containing from 8 to 20 moieties of each of said alkylene oxides, and alkyl silane polyoxyalkylene block copolymers similar to those described in U.S. Pat. No. 2,834,748.

Beneficially, the surfactant, or the mixture thereof, is the condensation product of ethylene oxide and nonyl phenol having a molecular weight of about 880, or an alkyl silane/alkylene oxide block copolymer of the formula

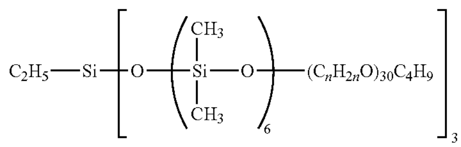

wherein $C_nH_{2n}O$ is a mixed oxyethylene/oxypropylene block of about 17 oxyethylene units and about 13 oxypropylene units.

Most preferred surfactants include those marketed by Dow Corning Corporation under the Trade Mark DC 193 and comprising an alkylsilane/alkylene oxide block copolymer.

Process for Preparing the Syntactic Phenolic Foam Compositions:

The novel syntactic phenolic foams of the present invention may be prepared according to four primary routes:

1. Expansion of a liquid system to fill a mould from an initial 5-40% of its final volume. (Examples 1 & 3)
2. Casting of a liquid system to fully fill the net shape of a mould. (Example 2)
3. Encapsulation and wetting of macrofillers by a liquid system. (Example 4)
4. Compression of a dough-like system from 20-50% above the final mould volume down to the net volume. (Examples 5 & 6)

Each route listed above may be optimised for the different end uses and industries within which it will be used. Route 1 above is suited to the use of expandable microspheres with or without the addition of process water and additional functional fillers. Routes 2-4 are relevant to the use of ready expanded thermoplastic microspheres—their 'wet' form as supplied already constitutes 85% water. In some cases (e.g., Example 4), this water alone is sufficient to provide adequate fluidity to the syntactic foam system.

Where chemically stable thermoplastic copolymer microspheres are utilized, certain pre-mixes may be manufactured and stored or supplied. For example, the unexpanded Expancel 551DU grade may be pre-blended with reactive phenolic resole resin and stored for 2-12 months prior to use depending on the storage temperature (Examples 1 & 3). The expanded grades may also be pre-mixed with phenolic resole resin to form resinous 'doughs' of 0.2-0.25 specific gravity that require the subsequent addition of catalyst. These may be stored for 2-6 months depending on the storage temperature but care must be taken to avoid their drying out and hence sealed containers are a prerequisite.

Optionally, a premix may also be made of the expanded microspheres with catalyst to create a 'syntactic catalyst' pre-mix. This is vital if any form of pre-mix is to be used with the PAN-based microspheres such as Expancel grade 091 WE d24. Due to the very high volumetric ratio between "syntactic catalyst" pre-mixes and the other resin or catalyst component, specific water-based pigment dispersions are beneficially used to ensure even mixing by visual inspection. Preferred non-inhibiting pigment dispersions are supplied by Racing Colours Ltd., Cheltenham, UK, although the invention is not so limited. The use of a "syntactic catalyst" pre-mix route allows the incorporation of other reactive additives such as boric acid into this component of the system. Fibres (glass, carbon or aramid, typically) may be successfully added to premixes based on either resin or catalyst.

Primary blending of the syntactic foam components is preferably carried out in low shear planetary mixers, horizontal ploughshare mixers or ribbon blenders. The liquid premixes based on unexpanded microspheres may be pumped and dispensed through appropriate machinery being mixed with the separate catalyst stream in a static mixer.

Syntactic Phenolic Foam Composition:

Once heat is applied to a catalysed resin/unexpanded microsphere blend, it is important that crosslinking of the resin occurs rapidly after full expansion in order to avoid cell rupture. In the case of the ready expanded material, speed is also required for the same reason although a protracted low temperature cure will also work. This is one of the primary reasons behind the choice of a highly reactive, polyfunctional phenolic resole resin. The advantage of this resin is that the reactivity may be readily modified by the inclusion of water or higher molecular weight ('slow') resole without affecting its ability to fully cross-link and achieve maximum physical properties. This is not typical of conventional phenolic resole resins.

Application of heat for curing may be via conduction (heated mould) or through the use of Microwave, Radio Frequency or Long Wave Infrared energy. The system's reactivity should be balanced to allow optimum material flow and expansion followed by rapid cross-linking. It is also possible to use exothermic heat to cure a mixture but this proves much more variable and harder to control. Invariably, exothermic heat is involved anyway but it should not dominate. In order to achieve optimum syntactic foam properties, the matrix should be cross-linked in less than 15 minutes, preferably less than 10 minutes, more preferably less than 5 minutes at 60 to 80° C.

Unexpanded microspheres may be added in the 0-40% (w:w—0 to up to 40 parts:100 parts of phenolic resin), preferably 7.5-30% (w:w), optionally, 10-25% (w:w), for example about 25% (w:w). Above 25% (w:w), extra material can still be incorporated but such extra material does not readily produce greater volume since it appears to reach an efficiency peak.

Wet expanded microspheres may be blended in a weight ratio of from 0.07:1 to up to 10:1 of the wet microspheres to phenolic resin, although this must be limited to the addition of 7-20, for example 10-15, % (w:w) if the system is to remain fluid as required for the purposes illustrated in Example 2 & 4. At low expanded microsphere ratios (Examples 2 & 4), the wet microspheres are added at 10-20% w:w (10-20 parts to 100 parts of resin, both by weight) and the resulting material is pourable/castable leading to a rapid curing matrix that is rigid. At high expanded microsphere to resin ratios (Examples 5 & 6), the uncured material is dough-like and cure times are necessarily longer (3-4 hours). The foams may be extremely low in density with resilient character.

Properties of the Syntactic Phenolic Foam Composition:

The thermoplastic microspheres are themselves very flammable whilst cured phenolic resin is dense and brittle. Conventional phenolic foams are weak and friable for this reason.

The syntactic phenolic foams of this invention are semi-resilient and non-friable (comparable with other structural foams). Densities may be produced in the range 20-800, for example 20-200 or 350-775, kg/m$^3$ depending on formulation and additives. Despite the apparently flammable microsphere content, these syntactic foams prove to be highly resistant to temperature and fire, probably due to the solubilisation of the polymer shell of the microspheres by the phenolic resin.

Desirable flame stability is also observed whereas conventional phenolic foams and resin are often subject to spalling/punking.

The fatigue resistance of these syntactic phenolic foams has also been shown to be equivalent to high performance structural foam cores (e.g., marine grade PVC foam).

The syntactic phenolic foams of this invention display desirable processing flexibility depending on the ratio of resin to microspheres and whether expanded and/or unexpanded microspheres are used. At one end of the scale, the system is castable/pourable and may or may not expand. At the other end, the system is compression-mouldable dough.

EXAMPLE 1

A 10% (w:w—i.e. 10 parts by weight:100 parts by weight of phenolic resin) addition of unexpanded microspheres and 25% (w:w—25 parts by weight:100 parts by weight of phenolic resin) addition of water followed by 150-200% wt (150-200 parts by weight:100 parts by weight of phenolic resin) addition of boric acid.

This results in a castable expanding syntactic phenolic foam of ~400 kg/$m^3$ density that is highly fire quenching and thermally stable. The foam is suitable for extreme fire protection requirements.

A master-batch is produced from the following components:

| Component | Amount |
|---|---|
| Phenolic resin J20/1235L (Borden Chemical) | 100 parts |
| Expancel 551DU-40 (Casco Products) | 10 parts |
| Surfactant DC193 (Dow Corning) | 1 part |

The above materials are readily blended with low shear mixing equipment. This master-batch may be stored for extended periods of 2-6 months depending on storage temperature (ideally 5-20° C.). After storage, it should be re-mixed prior to use.

On a daily basis, 25 parts by weight of water (to 100 parts by weight of phenolic resin) and 150 parts by weight of granular boric acid (specifically Optibor TG from Borax Corp.—150 parts by weight of boric acid: 100 parts by weight of phenolic resin) are added to an appropriate quantity of the master-batch. This mixture is then kept agitated in a suitable mixing vessel that is capable of keeping all the materials efficiently mixed. This resinous master batch is preferably used at a temperature of 40-45° C. for optimum control of moulding. Once heated to this temperature, the uncatalysed mixture is only stable for a period of ca. 30 minutes at 40 to 45° C. Heating may therefore be effected by the use of an in-line heat exchanger just prior to catalysation and dispensing or, alternatively, by pre-heating the boric acid to 80-85° C. and adding this on a batch scale that may be dispensed within the above time limit. Controlled microwave heating may be optionally used for rapid heating on a small scale, typically less than 10 kg.

Tooling for the manufacture of panels or three-dimensional structures is pre-heated to a temperature of 70-80° C., preferably 73-77° C. The mixture above is then catalysed with 10-11% wt. (i.e., 10-11 parts by weight:100 parts by weight of resinous master-batch) of an acidic catalyst such as Phencat 10 from Borden Chemical. This is preferably carried out by accurately dispensing the two liquid streams (of the resinous master-batch and of the catalyst) into a static mixer and then directly into the mould. Catalysation of a large mass of material is risky unless it can be used within approx. 5 minutes. Moulds should be orientated so as to produce the maximum possible liquid depth at their base. 40% of the mould volume should be dispensed by weight, i.e. for every liter of mould volume, dispense 400 g of the reactive system.

If the above procedure is correctly carried out, then moulds will be filled due to the expansion of the syntactic foam in 4-6 minutes at 70 to 80° C. The syntactic foam is cured for handling purposes in 10-15 minutes from the start of dispensing.

In tests carried out according to the ASTM E119 standard, a 50 mm thick panel without any skins was found to have a back face (unexposed to the fire source) of only 80° C. after a period of 2 hours. The cured material with appropriate skins of either phenolic composite or steel is capable of giving high resistance to cellulosic and hydrocarbon pool or jet-fire conditions at low thickness. Also, in simulated jet fire testing with a hydrocarbon flame temperature of 1260° C., a 25 mm thick panel with 10 mm steel skins was able to restrict the back face steel temperature to only 300° C. after a period of 30 minutes. After fire exposure, the charred syntactic phenolic foam is still rigid and semi structural.

The material of the above example has also been tested successfully in advanced lightweight paper and data fire protection devices for fire safe utilities. In testing according to the UL72 standard for the 'Fire Resistance of Record Protection Equipment', a moulded cubic structure having walls with a 50 mm wall thickness of the foam of this Example in combination with a cast 25 mm sodium metasilicate phase change layer, the walls defining a 300 $mm^3$ inner void, was able to pass the 1 hour requirement of fire exposure and thermal 'soak out'. In this test, the air in the inner void within the cube is required to remain below a maximum temperature of 55° C. In a further test to the same UL72 standard based on a foam of this Example with an 80 mm wall thickness and no phase change layer, the air temperature of the inner void was found to have risen less than 1° C. after 1 hour's fire exposure where the external temperature of the furnace at that point was 927° C.

Moulded covers for critical actuator devices in both the building and offshore industry are a further application of the foam material of this Example. In testing of such moulded products to industry standards where a constant test temperature of 300° C. is specified, 25-40 mm thickness of a foam of this Example have been found to provide between 1-2 hours protection for the actuator mechanism, keeping it below a maximum of 120° C.

EXAMPLE 2

A 12% (w:w i.e. 12 parts by weight:100 parts by weight of phenolic resin) addition of expanded microspheres and 10% (w:w—10 parts by weight:100 parts by weight of phenolic resin) addition of water followed by 100 parts by weight addition of boric acid (100 parts by weight boric acid: 100 parts by weight phenolic resin).

This results in a castable non-expanding syntactic phenolic foam of ~750 kg/$m^3$ density that is highly fire quenching and thermally stable. The foam is suitable for extreme fire protection requirements, as outlined for the foam in Example 1, and is beneficial where a true castable system is required by the end application. It is also capable of curing without the use of external heating.

A typical formulation is based on:

| | |
|---|---|
| Phenolic resin J20/1235L (Borden Chemical) | 100 parts |
| Expancel 551WE d36 80 (Casco Products) | 12 parts |
| Surfactant DC193 (Dow Corning) | 1 part |
| Water | 10 parts |
| Boric acid (Optibor TG) | 100 parts |

The above mixture is preblended with any reinforcing fibres, e.g., glass or carbon, that may be required, followed by 5-10% (5-10 parts by weight:100 parts by weight of the overall master-batch) Phencat 15 (ex Borden Chemical). The catalysed system is then poured or pumped into moulds where it forms the net shape of the mould without any expansion or shrinkage. By controlling process temperature between an ambient temperature of about 15° C. and 50° C., components may be demoulded in times between 30 minutes and up to several hours. This system is also useful for filling cavities.

Despite its greater density, the foam of this Example has been found to be at least as efficient in fire/thermal resistance and may often be more cost-effective due to its ability to be used with low cost tooling and low curing temperatures. For example, a panel of the present Example whose foam core is 40 mm thick with 10 mm steel skins, was shown to limit the back face temperature rise to only 70° C. after 70 minutes exposure. Conversely, in a test according to ASTM E119, the back face temperature of a panel of the present invention whose foam core is 30 mm thick was only 120° C. after 90 minutes test duration.

EXAMPLE 3

The basic foam composition of Example 1 with 25% (w:w 25 parts to 100 parts phenolic resin) addition of unexpanded microspheres designed for the production of flat sheet or three-dimensional products.

A key feature is the syntactic foam's ability to impregnate skins of woven, stitched or otherwise bonded layers of fibrous reinforcement (e.g., glass cloth, carbon cloth,.) whilst expanding to produce an integral one-step sandwich panel. This can be carried out by pre-impregnating the catalysed syntactic foam system between reinforcement layers and further processing if desired, or, alternatively, simply by pouring the system between dry reinforcement layers and allowing it to expand under the application of heat.

A master-batch is produced from the following components:

| | |
|---|---|
| Phenolic resin J20/1235L (Borden Chemical) | 100 parts |
| Expancel 551DU-40 (Casco Products) | 25 parts |
| Surfactant DC193 (Dow Corning) | 1 part |

The above materials are readily blended with low shear mixing equipment. The master-batch may be stored for extended periods of 2-6 months depending on storage temperature (ideally 5-20° C.). This may be extended to at least 12 months at temperatures below 0° C. It should be re-mixed after storage and prior to use.

The above master-batch, known as PT774, may optionally be used with the addition of 0-15% ((w:w)—0-15 parts: 100 parts master-batch) Expancel 551WE-40-d36 expanded microspheres in water and/or 0-15% ((w:w) 0-15 parts:100 parts master-batch water). Either or both of these additives must be added on a daily basis to avoid instability problems. The mixture above should be catalysed with either 10-15% ((w:w) 10-15 parts:100 parts full master-batch) of a first formulated acidic catalyst (50% Phencat 15/50% Budit 380 ex Chemische Fabrik Budenheim (w:w)), where additional expanded microspheres and/or water have been added, or 4-6% ((w:w) 4-6 parts:100 parts full master-batch) of a second formulated catalyst (20% Phencat 15/80% Budit 380 ex Chemische Fabrik Budenheim (w:w)) just prior to dispensing, ideally through a static mixer, as in Example 1 or 2. The resultant mixture should ideally then be mixed or recycled in temperature-controlled environment to ensure that the mix achieves a stable temperature in the 15-25° C. range, preferably 18-23° C., optionally about 20° C.

Moulds or flat-sheet tooling must be held in a hydraulic press at 60-80° C., for example 60-65° C. The dispensing of 10-12% ((w/vw—of the catalysed system with respect to the 100 volumes of the mould) will produce a tough, lightweight phenolic syntactic foam with a density of 100-140, for example, 100-130, kg/m$^3$ within 15-20 minutes, having a compressive strength of 0.7-1.0 MPa and a flexural strength >2 MPa. The use of microwave or radio frequency energy to expand and cure the syntactic phenolic foam is able to produce a foam with a density as low as 40 kg/m$^3$.

Syntactic phenolic foam of the above example offers a thermal conductivity (k or lambda value) of 0.030-0.035 W/m/K as well as good acoustic and impact properties. It is valuable as a core material in advanced lightweight, fire resistant structures, especially in aerospace and transportation where it complies with international standards for flammability, flame spread, smoke/toxic fume emission, heat release, etc. The foam of the present Example is especially valuable in its ability to impregnate skins of fibrous reinforcement as it expands in the heated moulds described above, thus producing a lightweight sandwich structure in a single processing step.

Ultimate performance is dependent on design and the material is readily suited to low weight fire barrier applications. The foam of the present Example has been tested successfully according to a wide range of fire standards across a range of potential industries. Examples of its performance are given in the table below:

| STANDARD | PERFORMANCE |
|---|---|
| BS6853 | Category 1 |
| NES713 | Toxicity Index <5 |
| ATS1000.001 | Smoke & Toxicity pass |
| IMO Res. A653(16) | Pass (walls & ceilings) |
| IMO Res. MSC 61 (67) | Pass |
| FAR 25.853 (Heat release) | Pass (24.0/32.7) |

EXAMPLE 4

A matrix for insulative building panels based on partly or fully expanded polystyrene beads. Here the microsphere additive is around the 10% ((w:w)—10 parts by weight to 100 parts by weight of the phenolic resin) level of either the unexpanded or wet expanded grade. The resulting panels are both stronger and more insulative than polystyrene foam alone whilst offering a significant level of fire resistance.

On a daily or batch basis, the following resinous blend is prepared in a suitable mixing vessel:

| | |
|---|---|
| Phenolic resin J20/1235L (Borden Chemical) | 100 parts |
| Expancel 551WE 40 d36 (Casco Products) | 10 parts |
| Surfactant DC193 (Dow Corning) | 2 parts |
| Boric acid (Optibor TG ex Borax) | 20 |

A known weight of 15-35, for example 15-25, kg/m$^3$ polystyrene beads with a particle size 2-6 mm (e.g., ex Springvale) is transferred to a high volume device, such as a ploughshare mixer. The above resinous blend is then catalysed with 3 to 6, preferably 4 to 5, % (w:w) (4 to 5 parts by weight:100 parts by weight of resinous blend) Phencat 10 (Borden Chemical), ideally via a static mixer/dispenser as in above examples. The catalysed resinous blend system is added to the polystyrene beads (or other macrofiller) with agitation in a mass ratio of between 1:1 to 1.75:1, for example about 1.2 to 1.5:1, (Catalysed resinous blend system:polystyrene beads, w:w) and mixing is maintained for 1-2 minutes so that the beads are evenly coated.

When fully expanded bead is being used, compression moulds are prepared with the ability to give a suitable, for example 40%, over-pack volume. The coated beads are then transferred to the moulds and levelled at the predetermined, for example 140%, mark. The moulds are then compressed in a suitable device such as a hydraulic press down to their 100% mark with heating up to 80° C., for example in the range 60-80° C. Handleable panels are produced within 10-15 minutes in this way. Use of microwave or radio frequency energy can significantly reduce this cure time to around 2 minutes.

Where partly expanded bead is used, the mix can be placed in a coffin mould or other sealed container and the exothermic curing reaction will lead to further expansion to yield similar results to those obtained when a fully expanded bead is being used. Where a high volume output is required, then a modified continuous foaming line can be used.

The syntactic, boric acid containing matrix that encapsulates the polystyrene beads produces a stronger and more thermally insulating structure than pure polystyrene foam, whilst producing a stable carbon skeleton in a fire resistance scenario. Approximately 45-80 minutes insulation resistance against a cellulosic fire curve (e.g., BS476 Pt22/ISO 834) is achievable from a 100-150 mm panel of this example with 0.5-1 mm steel skins. The requirement is typically 30 minutes.

The table below gives strength and fire resistance data results based on a supporting matrix to polystyrene bead ratio of 1.2:1 and 1.5:1:

| Property | Units | Value 1.2:1 | Value 1.5:1 | Method of test |
|---|---|---|---|---|
| Compressive Strength | kPa | 180 | 290 | |
| Density | gms/liter | 47 | 56 | |
| Lambda | mW/m ° K | 34 | 33.6 | |
| Acidity | pH | 7.84 | 7.84 | |
| Max Flame Spread parameter $FSP_c$ | $s^{-1/2}$ | 0.37 | | ANSI/FM 4880 April 2001 |
| 5 sec average $FSP_c$ | $s^{-1/2}$ | 0.33 | | |
| Thermal Response Parameter TRP | $kWs^{1/2}/m^2$ | 166 | | |
| Critical Heat Flux for Ignition CHF | $kW/m^2$ | 20 | | |
| Maximum Heat Release Rate | $kW/m^2$ | 144 | | |
| Heat of Combustion | KJ/g | 30 | | |

The density figure given above compares very favourably with Lamella Rockwool at 124 g/l, but it is only approximately twice the density of conventional Expanded Polystyrene (EPS) insulation board.

The Lambda figure at 34 mW/m°K is marginally better than that quoted for conventional high density EPS, but it is much better than Lamella Rockwool, quoted at 42 mW/m°K. The acidity figure is significant in that the vast majority of products containing phenolic resin have acidic properties, with pH levels between 2-4. This product with pH at 7.84 is expected to have none of the corrosive tendencies normally associated with phenolic foams. All the fire related figures are summarised through calculation of the '5 second average $FSP_c$'. The value obtained for the product of 0.33 is well within the range allowed (less than 0.52) under the stated standard as a core acceptable for panels used in external envelopes and other sections of the Factory Mutual approved building.

Of course, the above approach would also be effective with other lightweight macrofiller materials having a particle size of greater than 2 mm, a specific gravity of less than 1.0 and a low volumetric cost, e.g., recycled foam, cork, etc. Ratios (0.5 to 5.0:1, for example, 1.2-4.5:1—w:w) of the syntactic phenolic matrix to EPS beads are also known to be desirable where improved fire resistance is required. The following table shows how the density of final phenolic syntactic foam of this Example may be varied in the range of 40-100 kg/m$^3$, by altering the weight ratio of the syntactic phenolic matrix to the macrofiller(s), in this case, polystyrene beads:

| Ratio to 1 of bead | Density (kg/m$^3$) |
|---|---|
| 0.6 | 40 |
| 0.8 | 43 |
| 1.2 | 50 |
| 1.5 | 56 |
| 1.75 | 60 |
| 2 | 64 |
| 4 | 100 |

EXAMPLE 5

Compression mouldable, dough-like materials typically having a density of 40-60 kg/m$^3$, with a wet expanded microsphere ratio of 5:1-10:1 (weight:weight of phenolic resin) based on homopolymer or copolymer microspheres, the microspheres having a density of 36 kg/m$^3$. Cured, dry syntactic phenolic foam densities of between 60-150 kg/m$^3$ are also achievable with different ratios.

1 kg Expancel 551WE d36 is blended with a pre-mixture of:

20 g Phencat 15

20 g Phencat 382

2 g Gold Cup Red (water based pigment dispersion)

in a planetary mixer until the colour is evenly distributed. To this "syntactic catalyst", a phenolic resin blend of:

200 g J20/1235L phenolic resin (Borden Chemical)

2 g DC193 surfactant (Dow Corning)

2 g Gold Cup Blue (water based pigment dispersion)

is added along with 20 g 13 mm glass fibres. The whole is blended to an even colour change and then charged to a mould pre-heated to 55° C.

The catalysed material is compressed by at least 25% during which time ca. 40% wt. water is released from the mould (40 parts of water is released from a starting weight of 100 parts)). After 2 hours curing in the mould, the syntactic foam panel is released and dried/post-cured in a recirculating oven at 80° C. In this example, the longer curing/post-curing time is caused by the quantity of water in the system, i.e. >50-70% (w/w).

When all water has been removed, this ultra lightweight, resilient phenolic syntactic foam has a density of ~50 kg/$m^3$ and a lambda value of less than 0.035 W/m/K.

EXAMPLE 6

Compression mouldable, dough-like materials with a wet expanded PAN-based microsphere ratio of 5:1-10:1 (w:w—5-10 parts: 1 parts of phenolic resin. Densities of between 20-90 kg/$m^3$ are achievable, for example 20-50 kg/$m^3$.

1 kg Expancel 091WE d24 is blended with a pre-mixture of:

75 g Phencat 152 g Gold Cup Red (water based pigment dispersion)

in a planetary mixer until the colour is evenly distributed. To this "syntactic catalyst", a phenolic resin blend of:

100 g J20/1235L phenolic resin (Borden Chemical)

2 g DC193 surfactant (Dow Corning)

2 g Gold Cup Blue (water based pigment dispersion)

is added along with 10 g 25 mm carbon fibres. The whole is blended to an even colour change, charged to a shear-edge mould at 140-150% (v/v) over-pack (i.e., excess volume above that of the mould cavity) and then compressed at a mould temperature of 45° C. for one hour after which the temperature is increased to 60° C. for a further hour.

After the initial cure cycle, the syntactic phenolic foam panel is released and dried/post-cured in a recirculating oven at 80° C. In this example, the longer curing time is caused by the quantity of water in the system, i.e. >50-70% (w/w).

When all water has been removed, this ultra lightweight, resilient phenolic syntactic foam has a density of ~35 kg/$m^3$, compression strength of 0.25 MPa, Linear Elastic Modulus of 14 MPa and a lambda value of less than 0.033 W/m/K. A resilient foam according to this embodiment is capable of being repeatedly compressed by 80% and fully recovering its dimensions as well as its strength. Fibres of various types may be incorporated at lengths between 100 micron and 25 mm. These are beneficial to certain mechanical properties as well as fire resistance. PAN-based microspheres are used to give improved elevated temperature performance at the lowest densities.

The invention claimed is:

1. A highly reactive phenolic resole resin, the resin being obtained by reacting a substituted or unsubstituted phenol and an aldehyde in the presence of an alkaline catalyst at a temperature of no more than 65° C. and then neutralising to a pH of 5.5-6.6.

2. The highly reactive phenolic resole resin of claim 1, in which the highly reactive phenolic resole resin is obtained by reacting a substituted or unsubstituted phenol and an aldehyde in the presence of an alkaline catalyst at a temperature of no more than 60+2° C. before neutralisation of the catalyst.

3. The highly reactive phenolic resole resin of claim 2, in which the highly reactive phenolic resole resin is obtained by reacting a substituted or unsubstituted phenol and an aldehyde in the presence of an alkaline catalyst at a temperature of no more than about 60° C. before neutralisation of the catalyst.

4. The highly reactive phenolic resole resin of claim 1, in which the aldehyde is formaldehyde.

5. The highly reactive phenolic resole resin of claim 1, in which the alkaline catalyst is sodium hydroxide.

6. The highly reactive phenolic resole resin of claim 1, in which the phenolic resole resin has a molecular weight of no greater than 1000 daltons.

7. The highly reactive phenolic resole resin of claim 1, in which the resin is capable of fully crosslinking at temperatures between 15° C. and 25° C.

8. The highly reactive phenolic resole resin of claim 1, in which the resin is capable of fully crosslinking at temperatures between 15° C. and 25° C., in the presence of up to ten times its own weight in water.

9. The highly reactive phenolic resole resin of claim 1, in which the resin has a free phenol content of 12-15%(w/w).

10. A pre-mix for a syntactic phenolic foam composition, the premix comprising:

thermoplastic microspheres selected from the group comprising thermally expandable microspheres and thermally expanded microspheres, the microspheres comprising a thermoplastic polymer shell made of a homopolymer or copolymer of 100 to 25 parts by weight of a nitrile-containing, ethylenically unsaturated monomer, or a mixture thereof; and 0 to 75 parts by weight of a non-nitrile-containing, ethylenically unsaturated monomer, or a mixture thereof; and a propellant, or a mixture thereof, trapped within the thermoplastic polymer shell; and the highly reactive phenolic resole resin of claim 1.

11. The pre-mix of claim 10, in which the highly reactive phenolic resole resin is obtained by reacting a substituted or unsubstituted phenol and an aldehyde in the presence of an alkaline catalyst at a temperature of no more than 60+2° C. before neutralisation of the catalyst.

12. The pre-mix of claim 10, in which the at least one nitrile-containing ethylinically unsaturated monomer is selected from the group comprising acrylonitrile, methacrylonitrile, α-chloroacrylonitrile, α-ethoxyacrylonitrile, fumaroacrylonitrile, crotoacrylonitrile and a mixture thereof.

13. The pre-mix of claim 10, in which the at least one non-nitrile-containing, ethylinically unsaturated monomer is selected from the group comprising acrylic esters, methacrylic esters, vinyl chloride, vinylidene chloride, vinylidene dichloride, vinyl pyridine, vinyl esters, styrenes and derivatives and mixtures thereof.

14. The pre-mix of claim 10, in which the propellant is a volatile liquid selected from the group comprising short chain alkanes and isoalkanes and mixtures.

15. The premix of claim 10, wherein said thermoplastic polymer shell is made of a homopolymer or copolymer of 93 to 40 parts by weight of a nitrile-containing, ethylenically unsaturated monomer, or a mixture thereof.

16. The premix of claim 10, wherein said thermoplastic polymer shell is made of a homopolymer or copolymer of 7 to 60 parts by weight of a non-nitrile-containing, ethylenically unsaturated monomer, or a mixture thereof.

17. The premix of claim 11, in which the aldehyde is formaldehyde.

18. A syntactic phenolic foam composition formed by curing:

the highly reactive phenolic resole resin of claim 1;

an acidic catalyst for curing the phenolic resole resin; and thermoplastic microspheres selected from the group comprising thermally expandable microspheres and thermally expanded microspheres, the microspheres comprising a thermoplastic polymer shell made of a homopolymer or copolymer of 100 to 25 parts by weight of a nitrile-containing, ethylenically unsaturated monomer, or a mixture thereof; and 0 to 75 parts by weight of a non-nitrile-containing, ethylenically unsaturated monomer, or a mixture thereof; and a propellant, or a mixture thereof, trapped within the thermoplastic polymer shell.

19. The syntactic phenolic foam composition of claim 18, in which the syntactic phenolic foam composition is formed from a highly reactive phenolic resole resin, the phenolic resole resin having a molecular weight of no greater than 1000 daltons.

20. The syntactic phenolic foam composition of claim 18, in which the syntactic phenolic foam composition is formed from a highly reactive phenolic resole resin, the resin having a free phenol content of 12-15%(w/w).

21. The syntactic phenolic foam composition of claim 18, in which the syntactic phenolic foam composition is formed from the highly reactive phenolic resole resin, the highly reactive phenolic resole resin being obtained by reacting a substituted or unsubstituted phenol and an aldehyde in the presence of an alkaline catalyst at a temperature of no more than 60+2° C. before neutralisation of the catalyst.

22. The syntactic phenolic foam composition of claim 18, in which the acidic catalyst is selected from the group comprising a strong organic acid, an ester of a strong organic acid, a weak inorganic acid, an ester of a weak inorganic acid, and a mixture thereof.

23. The syntactic phenolic foam composition of claim 18 in which the syntactic phenolic foam composition is formed from a highly reactive phenolic resole resin, the resin being capable of fully crosslinking at temperatures between 15° C. and 25° C.

24. The syntactic phenolic foam composition of claim 18, in which the at least one nitrile-containing ethylinicalty unsaturated monomer is selected from the group comprising acrylonitrile, methacrylonitrile, α-chloroacrylonitrile, α-ethoxyacrylonitrile, fumaroacrylonitrile, crotoacrylonitrile and a mixture thereof.

25. The syntactic phenolic foam composition of claim 18, in which the at least one non-nitrile-containing, ethylinically unsaturated monomer is selected from the group comprising acrylic esters, methacrylic esters, vinyl chloride, vinylidene chloride, vinylidene dichloride, vinyl pyridine, vinyl esters, styrenes and derivatives and mixtures thereof.

26. The syntactic phenolic foam composition of claim 18, in which the propellant is a volatile liquid selected from the group comprising short chain alkanes and isoalkanes and mixtures thereof.

27. A process for preparing the syntactic phenolic foam composition of claim 18, the process comprising:

either curing a pre-mix for a syntactic phenolic foam composition, the premix comprising:

thermoplastic microspheres selected from the group comprising thermally expandable microspheres and thermally expanded microspheres, the microspheres comprising a thermoplastic polymer shell made of a homopolymer or copolymer of 100 to 25 parts by weight of a nitrile-containing, ethylenically unsaturated monomer, or a mixture thereof; and 0 to 75 parts by weight of a non-nitrile-containing, ethylenically unsaturated monomer, or a mixture thereof; and a propellant, or a mixture thereof, trapped within the thermoplastic polymer shell; and a highly reactive phenolic resole resin, the resin being obtained by reacting a substituted or unsubstituted phenol and an aldehyde in the presence of an alkaline catalyst at a temperature of no more than 65° C. and then neutralising to a pH of 5.5-6.6; or curing a highly reactive phenolic resole resin, the resin being obtained by reacting a substituted or unsubstituted phenol and an aldehyde in the presence of an alkaline catalyst at a temperature of no more than 65° C. and then neutralising to a pH of 5.5-6.6;

an acidic catalyst for curing the phenolic resole resin; and thermoplastic microspheres selected from the group comprising thermally expandable microspheres and thermally expanded microspheres, the microspheres comprising a thermoplastic polymer shell made of a homopolymer or copolymer of 100 to 25 parts by weight of a nitrile-containing, ethylenically unsaturated monomer, or a mixture thereof; and 0 to 75 parts by weight of a non-nitrile-containing, ethylenically unsaturated monomer, or a mixture thereof; and a propellant, or a mixture thereof, trapped within the thermoplastic polymer shell.

28. The process of claim 27, in which the highly reactive phenolic resole resin is obtained by reacting a substituted or unsubstituted phenol and an aldehyde in the presence of an alkaline catalyst at a temperature of no more than 60+2° C.

29. The process of claim 27, in which the acidic catalyst is selected from the group comprising a strong organic acid, an ester of a strong organic acid, a weak inorganic acid, an ester of a weak inorganic acid, and a mixture thereof.

30. The process of claim 29, in which the acidic catalyst additionally comprises a strong organic acid.

31. The process of claim 27, in which the at least one nitrile-containing ethylinically unsaturated monomer is selected from the group comprising acrylonitrile, methacrylonitrile, α-chloroacrylonitrile, α-ethoxyacrylonitrile, fumaroacrylonitrile, crotoacrylonitrile and a mixture thereof.

32. The process of claim 27, in which the at least one non-nitrile-containing, ethylinically unsaturated monomer is selected from the group comprising of acrylic esters, methacrylic esters, vinyl chloride, vinylidene chloride, vinylidene dichloride, vinyl pyridine, vinyl esters, styrenes and derivatives and mixtures thereof.

33. The process of claim 27, in which the propellant is a volatile liquid selected from the group comprising short chain alkanes and isoalkanes and mixtures thereof.

34. The syntactic phenolic foam composition of claim 21, in which the acidic catalyst is selected from the group comprising a strong organic acid, an ester of a strong organic acid, a weak inorganic acid, an ester of a weak inorganic acid, and a mixture thereof.

35. The syntactic phenolic foam composition of claim 18, wherein said thermoplastic polymer shell is made of a homopolymer or copolymer of 93 to 40 parts by weight of a nitrile-containing, ethylenically unsaturated monomer, or a mixture thereof.

36. The syntactic phenolic foam composition of claim 18, wherein said thermoplastic polymer shell is made of a homopolymer or copolymer of 7 to 60 parts by weight of a non-nitrile-containing, ethylenically unsaturated monomer, or a mixture thereof.

37. The syntactic phenolic foam composition of claim 21, wherein the aldehyde is formaldehyde.

38. The process of claim 28, wherein the aldehyde is formaldehyde.

39. A process for producing a highly-reactive phenolic resol resin, the method comprising the steps of:

1. reacting a substituted or unsubstituted phenol, and an aldehyde, in the presence of an alkaline catalyst, at a temperature of no more than 65° C.; and
2. neutralising the mixure to a pH of 5.5 to 6.6.

40. The process of claim 39, in which the reacting step is conducted at a temperature of no more than 60+/−2° C.

41. The process of claim 39, in which the reacting step is conducted at a temperature of no more than 60° C.

42. The process of claim 39, in which the aldehyde is formaldehyde.

43. The process of claim 39, in which the alkaline catalyst is sodium hydroxide.

* * * * *